J. L. FRITZ.
AIR VALVE FOR CARBURETERS.
APPLICATION FILED OCT. 22, 1917.
1,305,272.
Patented June 3, 1919.
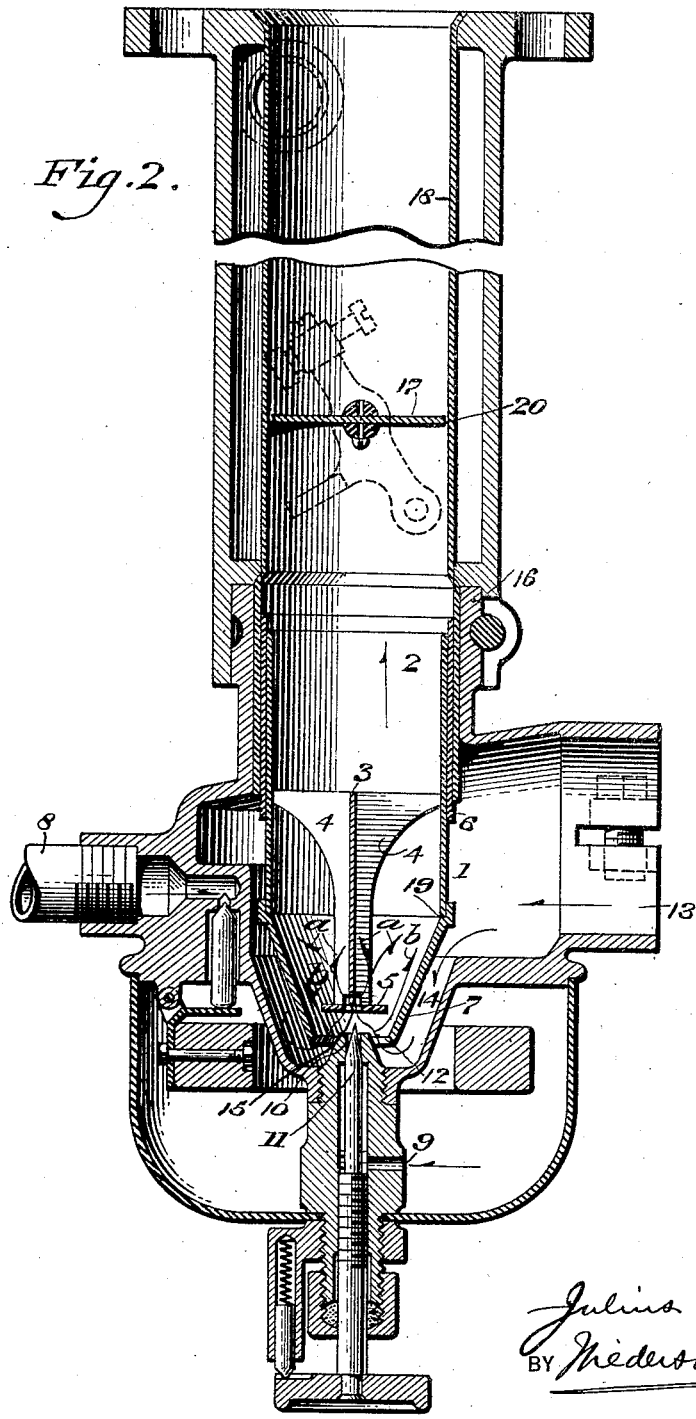
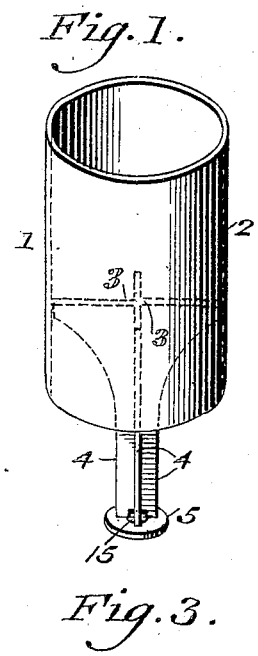
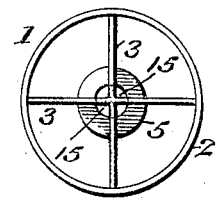
INVENTOR
Julius L. Fritz.
BY
ATTORNEYS

UNITED STATES PATENT OFFICE.

JULIUS L. FRITZ, OF FAIRVIEW, PENNSYLVANIA, ASSIGNOR TO ERNEST HAYWARD FAIRBANKS, OF MERCHANTVILLE, NEW JERSEY.

AIR-VALVE FOR CARBURETERS.

1,305,272.      Specification of Letters Patent.      Patented June 3, 1919.

Application filed October 22, 1917. Serial No. 197,949.

*To all whom it may concern:*

Be it known that I, JULIUS L. FRITZ, a citizen of the United States, residing at Fairview village, county of Montgomery, State of Pennsylvania, have invented a new and useful Air-Valve for Carbureters, of which the following is a specification.

In the air valves of the carbureters of the type to which my invention appertains, it has heretofore been the practice to employ a small imperforate disk or baffle plate at the bottom of the air valve which is normally located a short distance above and in line with the needle valve which controls the jet of incoming gasolene, as a result of which construction there is in practice a slight amount of choking or back pressure which has to be overcome not only when the engine is initially started but after it is doing its work under full load, which necessitates the employment of an unnecessary large quantity of gasolene, not only when starting, but during the entire period that the engine is running.

By my present invention, I locate in the lower air valve disk or baffle plate, which has heretofore been made solid or imperforate, a mixture balancing port of about three-sixteenths of an inch which is positioned directly in vertical alinement with the inlet port controlled by the needle valve, so that not only when the engine is initially started, but during its operation under partial or full load, there is a substantial balancing of the mixture upon both sides of the bottom disk of said air valve, or in other words within and without said air valve, whereby the latter not only initially but throughout the entire engine cycle properly responds instantaneously to the engine demands, but in addition there is in practice a very much less quantity of volume of gasolene or commingled air and gasolene required for the operation of the engine.

By my novel location and collocation of the aforesaid mixture balancing port in the bottom of the air valve with respect to the strangle tube, I am enabled to so greatly economize the use of gasolene and increase the efficiency of a carbureter equipped with my invention and my novel mixture balancing port in the bottom of the air valve that a carbureter equipped with my invention will give an increase of 30% to 40% mileage over the same carbureter not equipped therewith.

To the above ends my present invention relates generally to means for carbureting air, gasolene or other liquid hydrocarbons for use as fuel for internal combustion engines and more particularly to a novel construction of a carbureter air valve, wherein I have provided novel means, whereby both the proper balancing of the pressure of the mixture within and without the air valve as well as the proper commingling of the air and gasolene vapor passing through the carbureter exit to the engine under varying conditions is more effectively accomplished than heretofore by the employment of a novel mixture balancing port, which is positioned in a novel manner in a bottom baffle plate or disk of said air valve, heretofore made imperforate, whereby the back pressure, choking or temporary pocketing of the mixture in proximity to the baffle plate heretofore existing in carbureters of the type to which my invention appertains is dispensed with, and the engine is not only enabled to be initially started with greater ease but the consumption of gasolene is greatly economized, as I have found from practical experience that a carbureter of the character hereinafter referred to equipped with my invention will give a mileage of approximately sixteen to eighteen miles to a gallon of gasolene as against about eleven or twelve miles from the same type of carbureter where my invention is not employed.

For the purpose of illustrating my invention, I have shown in the accompanying drawings one form thereof which is at present preferred by me, since the same will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a perspective view of an air valve for a carbureter embodying my invention.

Fig. 2 represents a vertical sectional view of a carbureter to which my invention is applicable.

Fig. 3 represents a plan view of the air valve seen in Fig. 1.

Similar numerals of reference indicate corresponding parts in the figures.

Referring to the drawings.

The general type of carbureter to which my invention appertains, is that shown in the patent to Johnson, No. 1,059,368, patented April 22nd, 1913, and my novel features herein relate more particularly to the air valve thereof, and the positioning of a mixture balancing port therein, whose location and function will now be described.

1 designates my novel construction of carbureter air valve the same comprising a light preferably cylindrical, open ended sleeve 2 having a spider 3 located in its interior, preferably at a slight distance below its center, said spider terminating in a plurality of reduced arms 4 at whose lower terminus is located the baffle plate or disk 5, which as shown in said patent aforesaid has heretofore been made solid or imperforate, but wherein I provide the novel mixture balancing port 15 whose function will be hereinafter explained.

The air valve 2 is located within the sleeve 6, whose lower end is made conical to form the strangle tube 7, said sleeve being contained in the casing 16 which has the fuel inlet 8, through which the petrol is conducted to a float chamber, thence to the inlet port 9, and thence to the outlet port or discharge nozzle 10 which is controlled by the needle valve 11, there being an annular passage 12 between the lower end of the strangle tube 7 and said nozzle 10, as will be understood from Fig. 2.

13 designates the air inlet leading to the strangle tube by the downwardly converging passage 14. The other elements of the carbureter may be constructed in accordance with the Johnson patent aforesaid, and require no further description, as their construction and mode of operation may be readily understood therefrom, my present invention being directed to the construction, location and function of the mixture balancing port 15, and the very advantageous results and savings effected by its use.

In the operation of my device, it will be understood that the air valve 2 normally assumes about the position seen in Fig. 2, the baffle plate or disk 5 being located within the strangle tube 7 in such position that it is slightly above and out of contact with the discharge nozzle 10, the mixture balancing port 15 in said disk 5 being in vertical alinement with said discharge nozzle 10.

Upon the initial revolution of the engine or reciprocation of the engine pistons, air rushes in through the inlet 13 and the passages 14 and up through the passage 12 into and through the strangle tube 7.

The needle valve being slightly open and there being a slight vacuum formed in proximity to the upper end of the nozzle 10, it will be evident that the fuel will be caused by reason of said vacuum to flow upwardly out through said nozzle into the path of the inrushing air. The action or rush of the air against and around the baffle plate or disk 5 and through the mixture balancing port 15 will slightly raise said baffle plate and with it the air valve 2, said baffle plate being immovable or fixedly secured with respect to said air valve and the two rising and falling in unison, the air and the mixture take the paths indicated by the arrows $a$ and $b$, a portion of the mixture passing directly in a vertical line through the mixture balancing port 15, as indicated by the arrows $a$, and the remainder of said mixture as indicated by the arrows $b$ flowing upwardly around the outer periphery of said baffle plate 5, the two streams thereafter commingling within the air valve and flowing upwardly past the throttle valve 17 upon the opening of the latter through the exit tube 18 to the engine.

The air valve 2 whose lower edge rests normally on the annular shoulder 19 at the top of the strangle tube 7, upon leaving said shoulder, permits additional air to flow to the interior of the valve 2 in a direct path from the inlet 13 and the height that said air valve attains obviously depends upon the flow of air around the periphery of the disk 5 and through the mixture balancing port 15, so that when this flow of air decreases to a certain extent the air valve drops, its height when the engine is running under full or partial load being determined by the differential between the weight of the valve and the upward urge of the current of air, it being evident in practice, however, that the height or position of the air valve when the engine is running under partial or full load is substantially stationary because of the balance automatically attained between the weight of said valve and the upward urge of the current of air or mixture.

It will be obvious that the amount of air which is drawn into the engine through the exit pipe 18 or the amount of gasolene mixed therewith will vary with the type of engine and that the amount of gasolene taken up by the inrushing air during its passage through the mixture balancing port 15 and around the baffle plate or disk 5 will depend upon the distance between said baffle plate or disk 5 and the top of the nozzle 10, since the less the distance the less the fuel will be taken up, as it is obvious that when the baffle plate or disk 5 rises from the upper end of the nozzle 10 under a greater rush of air, there will be a slightly greater vacuum at the nozzle opening and a more rapid flow of fuel.

The position of the parts seen in Fig. 2 (assuming the needle valve 11 to be slightly open) is substantially the initial position assumed by the air valve, when the engine is initially started, the throttle valve 17 being preferably usually constructed, so as to have a slight clearance between its outer periphery and the contiguous inner wall of the exit tube 18, so that the engine can operate slowly when the valve is in closed position as seen in Fig. 2.

It will now be understood by those skilled in the art that when an air valve of the character I have described has the baffle plate or disk 5 made solid or imperforate, a greater flow or quantity of fuel or mixture with the current of incoming air is required to initially act upon the underside of the baffle plate or disk 5 to elevate the same, than is required when the mixture balancing port 15 is present as in my invention for the reason that in practice there is in this construction having the imperforate baffle plate a slight choking or back pressure or air pocket present in the space between said disk 5 and the nozzle 10 not only initially when the engine is started but more or less at all times when the engine is in operation under partial or full load, whereby an unnecessarily large volume of fuel or gasolene is required to meet the engine demands, since said pocket of air tends to retard the fuel from issuing readily from the nozzle 10.

By my present invention wherein the mixture balancing port 15 is employed there is not only at the instant the engine is initially started either by a crank or starter but at all times during the operation substantially a balancing of the pressure above and below the disk 5 so that a much lesser flow or quantity of gasolene is required in my device than in a carbureter, wherein the disk 5 is made solid or imperforate.

It will be further apparent to those skilled in the art that by the provision of the mixture balancing port 15 located in vertical alinement with and above the nozzle 10, I cause a jet of air to pass directly over and upwardly above the jet or nozzle 10, the effect of which is to instantaneously and more readily than heretofore lift the fuel from said nozzle.

In the practical use of my invention I have found it necessary to open the needle valve 11 only about ¾ of a turn which results in a corresponding saving of gasolene, whereas in the device of the prior art above referred to, the needle valve 11 has to be opened to very nearly its full extent or in other words substantially two to three turns, in order to furnish the requisite volume of the fuel to operate the engine either under a partial or full load.

The saving of gasolene or increase of mileage which I effect by my invention amounts to from four to six miles for each gallon of gasolene, since I have found from practical experiments extending over a considerable period that a carbureter having the disk 5 made solid or imperforate as in the prior art will give a mileage of only about 10 to 12 miles to a gallon of gasolene, whereas a carbureter equipped with my novel construction of mixture balancing port 15 collocated in vertical alinement with respect to the nozzle 10, as above described, will give a mileage of 16 to 18 miles per gallon of fuel.

The advantages obtained by my employment of the mixture balancing port 15 are apparent not only during the initial revolutions of the engine, since the pressure directed through the mixture balancing port almost instantaneously becomes substantially balanced in the chambers above and below the disk 5, by reason of the provision of said port, but there is in addition no back pressure or pocketing of the air or mixture in the space below the disk 5 since said port 15 instantly relieves this and the air valve as well as the disk 5 at the lower portion thereof becomes suspended in a mixture or pressure which is practically balanced or in substantial equilibrium above and below said disk 5, so that the automatic actuation or raising and lowering of the air valve and its adjuncts at all times is gentle and gradual and not jerky, not only during the initial revolutions of the engine but during the later periods when the engine is operating under a partial or full load.

It will be apparent that I have devised a novel and useful construction of an air valve for carbureters which embodies the features of advantage enumerated as desirable in the statement of the invention and the above description, and while I have, in the present instance, shown and described preferred embodiments thereof which will give in practice satisfactory and reliable results, it is to be understood that the same are susceptible of modification in various particulars without departing from the spirit or scope of the invention or sacrificing any of its advantages.

Having thus described my invention, what I claim as new and desire to secure by Letters Patent, is:—

1. As an improved article of manufacture the herein described air valve for carbureters for internal combustion engines, comprising a hollow, open-ended shell, and a baffle plate of less diameter than the diameter of said shell supported from said shell at a point below the latter and provided with a centrally located mixture balancing port extending therethrough.

2. As an improved article of manufacture, a carbureter air valve, comprising a hollow open-ended cylinder, a spider secured within the latter, and a baffle plate of less diameter than the diameter of said cylinder fixedly secured to depending extensions of said spider, at a point below the lower edge of said cylinder, said plate having a mixture balancing port therein.

3. In a carbureter, a casing, a fuel inlet, an air inlet, a strangle tube located intermediate of said inlets, a fuel nozzle adapted to discharge into said strangle tube, an open-ended air valve located within said strangle tube and carrying at its lower portion a baffle plate of less diameter than said valve and said plate having a centrally located mixture balancing port extending therethrough, said port being located above and in alinement with said nozzle, and a needle valve controlling the flow of fuel through said nozzle and mixture balancing port.

4. In a carbureter, a body having an air inlet opening in its side and an upwardly extending outlet connection, a downwardly tapering strangle tube, a fuel nozzle connected to said body and discharging into said strangle tube, an air valve slidably mounted above said strangle tube and extending upwardly into said outlet connection of said body and adapted to be raised by the flow of air upwardly through said downwardly tapering tube, and a baffle plate of less diameter than said valve located below said air valve and carried thereby and having a centrally located mixture balancing port therein located above said fuel nozzle and in alinement therewith.

JULIUS L. FRITZ.

Witnesses:
E. HAYWARD FAIRBANKS.
C. D. McVAY.

Copies of this patent may be obtained for five cents each, by addressing the "Commissioner of Patents, Washington, D. C."